United States Patent [19]

Edwards et al.

[11] 4,039,042

[45] Aug. 2, 1977

[54] ACOUSTICAL SPARKER PROBE APPARATUS

[75] Inventors: Richard C. Edwards, Kennewick; Richard L. Wilson, Richland, both of Wash.

[73] Assignee: Holosonics, Inc., Richland, Wash.

[21] Appl. No.: 724,324

[22] Filed: Sept. 17, 1976

[51] Int. Cl.$^2$ .............................................. G01V 1/06
[52] U.S. Cl. ............................... 181/106; 340/125 D; 324/10; 181/102; 181/113
[58] Field of Search .................. 340/125 D; 181/113, 181/102, 105, 106, 110; 324/10

[56] References Cited

U.S. PATENT DOCUMENTS

| | | | |
|---|---|---|---|
| 2,679,205 | 5/1954 | Piety .................................. | 340/125 D |
| 2,708,485 | 5/1955 | Vogel ................................. | 340/125 D |
| 3,368,194 | 2/1968 | Cholet et al. ..................... | 340/125 D |
| 3,537,542 | 11/1970 | Dubois et al. ..................... | 340/125 D |

*Primary Examiner*—Howard A. Birmiel
*Attorney, Agent, or Firm*—Wells, St. John & Roberts

[57] ABSTRACT

An acoustical sparker probe apparatus is described for generating a high energy acoustical pulse at a frequency between 600 hz and 10 khz in a borehole having a diameter between 50 mm and 100 mm. The apparatus includes an uphole electronic system having a low voltage AC power source which is directed through an electrical cable to a borehole probe that is moved along the length of the borehole. The borehole probe has a sparker section with electrodes for generating a high energy acoustical pulse when a high energy electrical spark discharge is created between the electrodes. The probe has a high voltage DC energy section with a voltage multiplying and electrical energy storage for receiving the low voltage AC from uphole and creating and storing over 100 joules of electrical energy at a voltage above 1000 volts within the probe. The probe has a triggering network for rapidly discharging the high voltage electrical energy across the electrodes at above 5000 amp for 10 µsec to create the high energy acoustical pulse. The probe has a discharge detection network for determining the occurrence of the peak discharge and generating a discharge signal that is transmitted uphole to a lapse time recorder. The energy storage network includes a plurality of cylindrical electrolytic capacitors physically mounted end-to-end in the probe.

10 Claims, 7 Drawing Figures

U.S. Patent  Aug. 2, 1977  Sheet 1 of 3  4,039,042
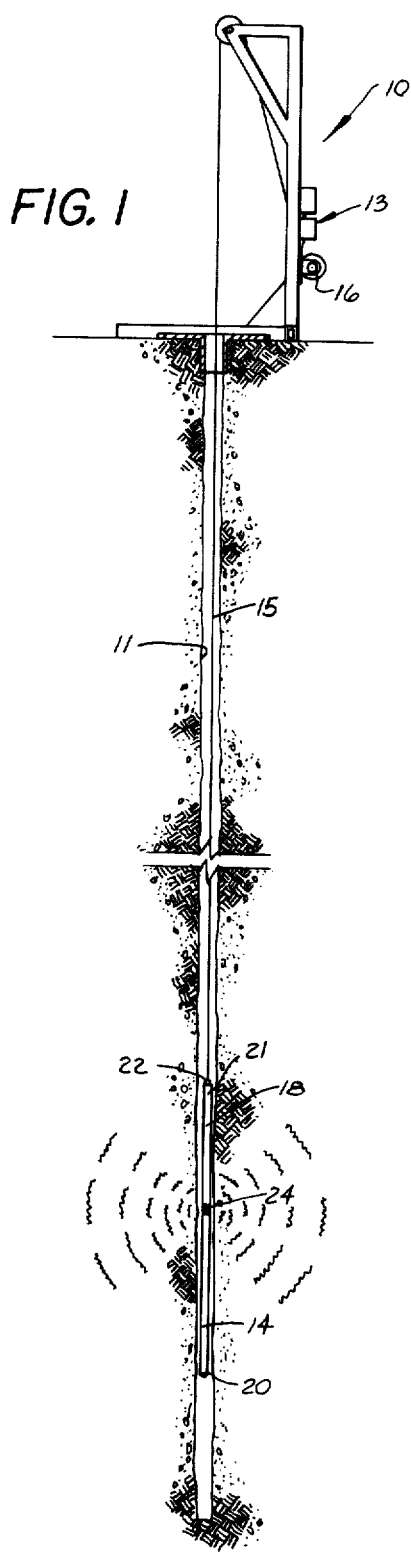
FIG. 1
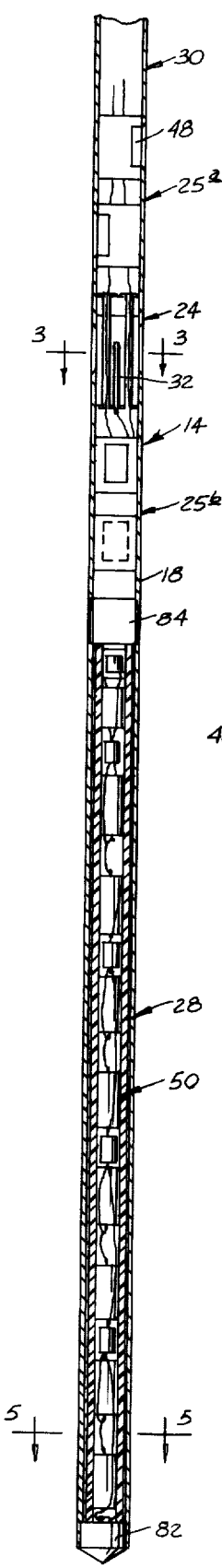
FIG. 2
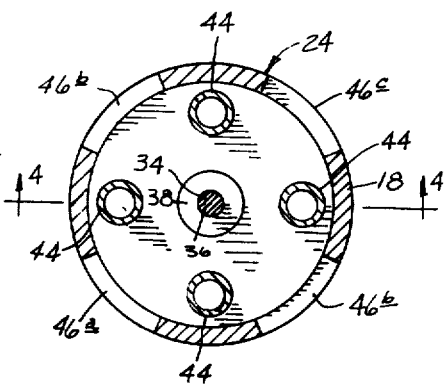
FIG. 3
FIG. 4
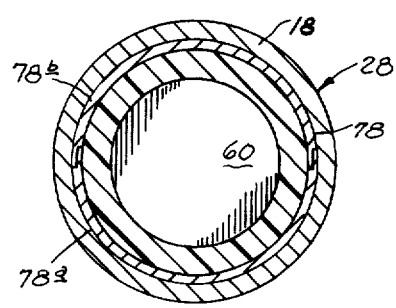
FIG. 5

ACOUSTICAL SPARKER PROBE APPARATUS

BACKGROUND OF THE INVENTION

This invention relates to seismic equipment for acoutically investigating the earth structure and more particularly to acoustical borehole probe apparatus designed to acoustically investigate earth structure at a frequency of between 600 hz and 10 khz.

Most investigatory boreholes have a diameter between 50 and 100 mm. It is often desirable to accurately investigate the earth region within 75 feet of the borehole. Seismic equipment has been developed to perform a gross or macro-investigation utilizing frequencies below 500 hz. Additionally, borehole probe equipment has been developed for micro-investigating the earth structure along the borehole and radially a few feet from the borehole. However, it has been very difficult to develop equipment that is capable of micro-investigating the region from 5 feet to 75 feet from the 50 to 100 mm diameter borehole.

Acoustical probes have been developed utilizing piezoelectric transducers for emitting pulsed low level energy in the frequency of 500 hz to 10 khz into the surrounding earth structure. However, such low energy pulses are generally only effective between 5 to 10 feet from the borehole in high attenuating earth structures.

In recent years, acoustical sparker probe devices utilizing an electrical discharge between electrodes for generating high energy acoustical pulses have been developed. Such devices utilize a high capacity electrical energy storage bank near the borehole opening for generating an electrical discharge of greater than 100 joules between the probe electrodes. However the range or depth of the probe from the storage bank is greatly restricted. The energy transmission loss per unit of length from the storage bank to the probe electrode increases esponentially with the electrical current in the transmission line. Generally, such devices are limited to boreholes having depths of less than 40 meters. There is a substantial need for a high-energy acoustical probe apparatus capable of generating high energy acoustical pulses for investigating earth structure of up to 75 feet radially from the borehole at borehole depths of more than 40 meters.

One of the objects of this invention is to provide a sparker acoustical probe apparatus that is capable of developing high-energy, acoustical pulses in the 600 hz to 10 khz range at borehole depths considerably greater than 40 meters.

An additional object of this invention is to provide an acoustical sparker probe apparatus that is capable of storing high-voltage energy within the probe itself that is sufficient to generate acoustical, high-energy pulses.

A further object of this invention is to provide a new acoustical sparker probe apparatus in which the probe has a capability of generating high voltage electrical energy and storing the energy in the probe and discharging the energy between electrodes of a probe sparker system.

A still further object of this invention is to provide a sparker probe apparatus that is capable of generating and transmitting high energy acoustical pulses into the earth surrounding the borehole in which the high energy is stored within the borehole utilizing conventional electronic components.

An additional object of this invention is to provide an acoustical sparker probe apparatus that is capable of generating high energy acoustical pulses into the earth at depths considerably greater than 40 meters in which there is no decrease in strength of the acoustical pulse as the probe moves further from the borehole opening.

A further object of this invention is to provide an acoustical sparker probe apparatus that is economical to manufacture and easy to operate.

An additional object of this invention is to provide an acoustical sparker probe apparatus having a high electrical energy storage capacity within a small diameter probe.

These and other objects and advantages of this invention will become apparent upon reading the following detailed description of a preferred embodiment.

BRIEF DESCRIPTION OF THE DRAWINGS

A preferred embodiment of this invention is illustrated in accompanying drawings, in which:

FIG. 1 is a schematic elevational view of an elongated borehole illustrating an acoustical sparker probe apparatus of the present invention in which the apparatus includes a probe that is mounted in a borehole at a substantial depth from the borehole opening;

FIG. 2 is a framentary longitudinal cross-sectional view of a section of the probe showing internal components thereof;

FIG. 3 is a transverse cross-sectional view taken along line 3—3 in FIG. 2;

FIG. 4 is a cross-sectional view taken along line 4—4 in FIG. 3;

FIG. 5 is a cross-sectional view taken along line 5—5 in FIG. 2;

BRIEF DESCRIPTION OF A PREFERRED EMBODIMENT

Figure 6:
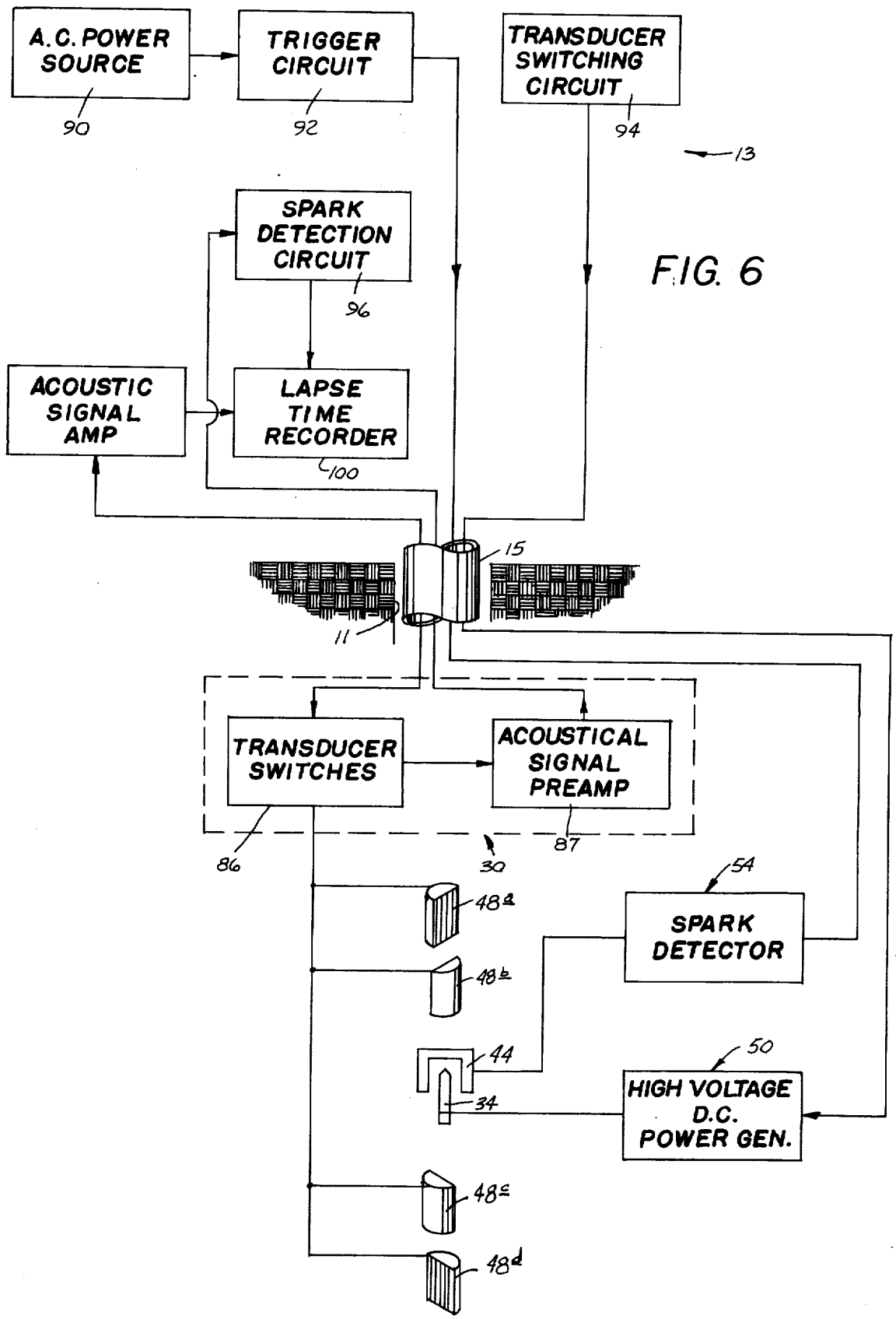
FIG. 6 is a schematic, block diagram showing the principle electronic system of the assembly.

An acoustical probe apparatus generally designated with the numeral 10 is illustrated in schematic form in FIG. 1. The acoustical probe apparatus 10 is designed to acoustically investigate the physical characteristics of the earth surrounding a borehole 11. The borehole is greater than 40 meters in length and has a diameter between 50 mm and 100 mm. The acoustical sparker probe apparatus 10 is designed to repeatedly generate and transmit high energy acoustical pulses, 10 to 20 λsec in duration into the surrounding earth. Reflections of the transmitted pulses are received by the apparatus 10 or by a remote receiving probe. The reflected acoustical waves or attenuated transmitted waves contain information concerning the physical characteristics of the earth surrounding the borehole.

The apparatus 10 includes an uphole electronic system 13 for controlling the transmission of the acoustical energy from a borehole probe 14. The probe 14 is connected through an electrical cable 15 with the uphole electronic system 13. The apparatus 10 includes a probe movement system 16 for lowering or positioning the probe at desired locations along the length of the borehole. FIG. 1 illustrates a substantially vertical borehole in which the probe is lowered by gravity therein. Other types of probe movement systems 16 can be utilized to move the probe in inclined or substantially horizontal boreholes. The inclination of the borehole is not particularly important to this invention as long as the borehole has a length of more than 40 meters and a diameter of between 50 mm and 100 mm.

The probe 14 includes an elongated tubular housing or casing 18 having a forward or front end 20 and a rearward or back end 21. The electrical cable 15 is connected to the probe through a cable connector 22 at the rearward end 21.

The probe 14 has four general sections — a central sparker section 24; a transducer section 25 which is divided into two subsections 25a and 25b; an elongated downhole high-electrical energy section 28; and an elongated instrument section 30.

In a preferred embodiment, the elongated, downhole high energy section 28 is located adjacent the forward end 20 downstream of the central sparker section 24. The elongated instrumentation section 30 is preferably adjacent the rearward end above the sparker section 24. In this configuration the transducer section 25a is upstream of the sparker section 24 and the transducer section 25b is downstream of the sparker section 24.

The sparker section 24 includes electrode means 32 with a main central electrode 34. The main electrode 34 is centrally mounted in a sparker cavity 43 defined by a cylindrical section of the casing 18 between two spaced liquid tight, electrically non-conductive plug elements 40 and 42. The main electrode 34 has a central brass electrically conductive rod element 36 terminating in a hemispherical tip 37. The brass element 36 is supported in an insulated sleeve 38 with the hemispherical tip 37 projecting therefrom. The brass element 36 and the insulated sleeve 38 are centrally supported in the cavity 43 by the plug element 40.

The sparker section 24 further includes a plurality of ground electrical electrode elements 44 angularly spaced about and radially spaced from the main electrode 34. The ground electrode elements 44 are formed of electrically conductive tubes 44. The tubes 44 extend through the plug elements 40 and 42 and serve as passages for electrical wires between the transducer sections 24a and 25b as well as ground electrodes.

The sparker section 32 additionally includes windows 46a, b, c, and d formed in the casing 18 at angularly spaced locations to permit ionizable liquid to flow in and out of the sparker cavity 43. In this particular configuration, the sparker section 24 is designed to emit an ionized liquid into the sparker cavity 43 through the windows 46. This application is particularly adaptable to conditions in which the borehole contains an ionizable liquid such as seawater or mineralized water. In some applications it may be desirable to provide an additional ionizable liquid system for enabling a spark to be discharged between the main electrode 34 and the ground electrodes 44. The angularly spaced, acoustical windows 46 enable the acoustical energy from the spark to be transmitted readily from the sparker cavity 43 into the surrounding earth. The angularly spaced windows 26 are preferably spaced at 90 degrees to provide azimuth orientation to the direction of acoustical energy as it is directed into the surrounding earth.

It is readily understood that in some applications it may be desirable to provide a liquid coupling system for coupling the sparker section to the surrounding earth to provide for an efficient transmission of the acoustical pulse into the earth. The windows 46 provide for more direct coupling of the acoustical pulse to the borehole walls. In some applications it may be desirable to fill the space between the casing and the borehole wall with a suitable transmission (ionized) liquid or paste such as water or a slurry of water and bentonite.

The transducer section 25 includes receiving transducers 48a-d for receiving reflected acoustical wave energy and for generating electrical signals proportional to the amplitude of the reflected wave. In the preferred configuration, four transducers 48a-d are angularly spaced about the axis of the probe corresponding to the angular position of the acoustical windows 46a-d. Transducers 48a and 48b are mounted adjacent to the sparker section 24 on the uphole side at 180° positions with respect to each other. Transducers 48c and 48d are positioned downhole of the sparker section 24 at 180° with respect to each other and 90 degrees with respect to transducers 48a and 48b. The angular spacing of the transducers 48a-d enables information to be obtained that is azimuth oriented with respect to the borehole. The probe does not need to be rotated to obtain such azimuth information.

Figure 7:
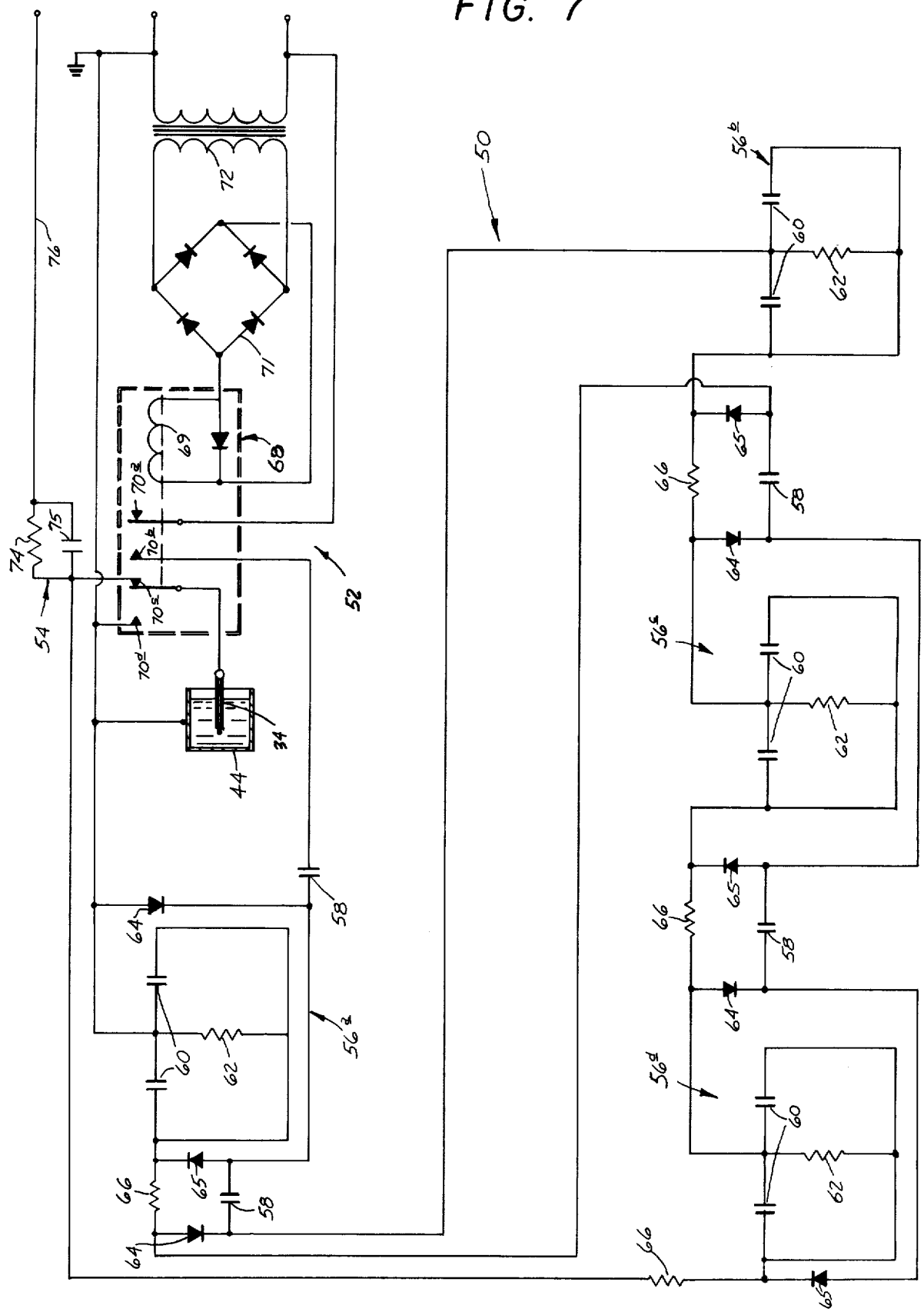
FIG. 7 is an electrical schematic view showing a downhole, high-energy section of the probe.

The elongated, downhole high electrical energy section 28 includes a cascading voltage multiplying and high energy storage network 50 (FIG. 7) for generating high voltage DC energy and storing the DC energy within the probe. The section 28 additionally includes a pulse triggering network 52 and a spark detection network 54. The cascading voltage multiplying a high energy storage network 50 includes a plurality of multiplying and capacitive storage stages 56a-d. Each stage 56a-d includes an input capacitor 58, and output capacitors 60 to store energy. Preferably the capacitors 58 and 60 are electrolytic capacitors of cylindrical shapes having diameters less than 4 cm.

Directional diodes 64 and 65 are mounted on each stage for developing the DC energy storage system. A surge resistor 66 is mounted in series with the diode 64 and 65 to protect the diodes. A stage resistor 62 is mounted in parallel with the output capacitors 60 to obtain the cascading effect. The applicant has found that a four-stage system operates quite adequately when the input capacitor 58 is rated at 20 $\mu$, 450 VDC and the output capacitor is rated at 200 $\mu$, 450 VDC. Satisfactory operation has been obtained when the stage resistor 62 is rated at 7.4 megohms and the surge resistor 66 is rated at 470 ohms. In this particular configuration, the cascading voltage multiplying network 50 builds a voltage N times the peak input voltage in which N equals the number of input capacitors 58 and output capacitors 60.

The pulse triggering network 52 (FIG. 7) includes a DC relay 68 having a coil 69 and contacts 70a-d. The DC relay 68 is connected to a full-wave bridge rectifier 71 that is in turn connected to a step-down transformer 72. The pulse triggering network 52 controls the application of an AC source of low voltage energy to the network 50 and additionally controls the discharge of the network 50 to the main electrode 34. When the relay 68 is energized at low voltage AC, energy is supplied to the network 50. When the relay 68 is de-energized, the network 50 is automatically directly connected to the electrode and a network 50 is discharged.

The spark detection network 54 (FIGS. 6 and 7) is directly connected to the output of the network 50 for sensing the discharge of the electrical energy between the main electrode 34 and the ground electrodes 44. The spark detection network 54 includes a high value resistor 74, preferably approximately 4.7 megohms. The resistor is mounted across high-energy capacitor 75 for generating a spark detection signal that is transmitted along terminal 76 to the uphole electronic system 13 to accurately determine the time occurrence of the acoustical pulse. Once the DC relay 68 is de-energized, the full voltage is applied across the electrodes to begin ionizing the liquid. The actual spark (peak discharge) may not occur until some 100 msec later. The time required to ionize the liquid is unpredicatable, thereby requiring an accurate determination of the 10–20 μsec acoustical pulse occurrence in the sparker cavity 43.

The high energy electrical section 28 is physically mounted in the case 18 between a nose cone 82 (FIG. 2) and a joint sleeve 84 that interconnects the section 28 with section 25b. The capacitors 58 and 60 are physically positioned within the section in end-to-end arrangement along the length of section 28. The capacitors 58 and 60 are supported in cushioning material 90. The section 28 includes a brass sleeve housing 78 (FIG. 5) having a lower longitudinal section 78a and an upper longitudinal section 78b. When it is desired to remove the network 50, the nose cone 82 is removed and the brass sleeve 78 pulled outwardly from the front end. The upper longitudinal section 78b is removed to expose the network 50.

The high energy electrical section 28 is within a few meters of the sparker section 24 with very little energy loss in transmitting the high voltage-high current energy from the section 28 to the sparker electrodes. The high energy electrical section 28 is preferably spaced downstream of the instrumentation section 30 so that the flux of the high voltage electrical energy does not interfere with the instrumentation section signals.

The elongated instrumentation section 30 of the probe 14 is shown schematically in FIG. 6. Instrumentation section 30 includes a transducer switching network 86 for sequentially activating the transducers 48. Additionally, instrumentation section 30 includes an acoustical signal preamplifier network 87 that receives the electrical signal generated by transducers and amplifies the signal for transmission through the electrical cable 15 to the uphole electronic system.

The uphole electronic system 13 includes as a principal component a low voltage AC power source 90 having an output voltage less than 250 volts (RMS), and preferably approximately 110 volts (RMS). The source current output is less than 5 amps and preferably less than 3 amps. Such low voltage Ac amps is easily transmitted through the cable 15 with very little power loss. The low-voltage AC energy is applied to the network 50 for generating high-voltage, high-energy pulse.

The uphole electronic system 13 further includes an uphole trigger circuit 92 for applying or interrupting the low-voltage AC energy to the network 50 by energizing and de-energizing the DC relay 68. When the source 90 is interrupted by the trigger circuit 92, the DC relay 68 automatically connects the network 50 with the main electrode 34 to initiate discharge.

The uphole electronic system 13 further includes a transducer switch unit 94 for controlling the downhole transducer switch network 86. The uphole system 13 includes a spark detection circuit 96 that receives the spark detection signal from terminal 76 and applies the spark signal to an elapse time recorder 100 for intitiating the time count from the occurrence of the spark to the receipt of the reflected signals. The acoustical signal generated by the transducers after being amplified by the preamplifier network 87 is transmitted through the cable 15 to the acoustical signal amplifier 98 for further amplification before input to the lapse time recorder 100. The lapse time recorder 100 records the lapse time between the receipt of the spark detection signal and the receipt of the reflected acoustical signals picked up by the transducers.

The particular system shown enables a low voltage AC power source 90 to be utilized of approximately 110 volts and less than 5 amps for building a high voltage, high energy system within the probe 15 that is capable of repetitiously generating an electrical discharge pulse every 6 to 10 sec of over 1000 volts having a surge current of greater than 5000 amps for more than 10 μsec in which the pulse width is between 50 and 100 μsec. This system is capable of rebuilding the high voltage, high energy charge every 5 to 10 seconds. Additionally, this system is designed to generate high energy pulses each having a frequency domain (spectrum analysis) of between 600 hz and 10 khz. Such frequency distribution is obtained by regulating the spacing between the main electrode 34 and the ground electrodes 44. Consequently this system is able to operate at an almost infinite depth in the borehole and provide a high energy acoustical pulse that is not dependent upon the position of the probe in the borehole.

It should be understood that the above described embodiment is simply illustrative of the principles of this invention and that numerous other embodiments may be readily devised by those skilled in the art without deviating therefrom. Therefore, only the following claims are intended to define this invention.

What is claimed is:

1. An acoustical sparker probe apparatus capable of generating and transmitting high energy acoustical pulses into the earth surrounding a borehole at desired locations along the length of the borehole, in which the borehole has a length greater than 40 meters and a diameter between 50 mm and 100 mm, comprising;
   a. an uphole low voltage AC electrical power source having an output voltage less than 250 volts (RMS) and an output current of less than 5 amperes (RMS);
   b. an elongated probe having an outer diameter less than the diameter of the borehole for being inserted into the borehole and being positioned along the borehole length;
   c. an electrical conduit extending between the probe and the uphole low voltage AC power source for transmitting the low voltage AC electrical energy from the uphole low voltage AC power source to the probe;
   d. said elongated probe having an elongated sparker section containing an electrode means for creating a high energy electrical discharge through an ionizable liquid and generating a resultant high energy acoustical pulse and transmitting the acoustical pulse into the surrounding earth; and
   e. said elongated probe having an elongated downhole high electrical energy section containing, (1) a cascading voltage multiplying and high energy storage network operatively connected to the sparker electrode assembly for receiving the low voltage AC electrical energy and for generating and storing high voltage DC energy of greater than 1000 volts and 100 joules; and (2) a pulse triggering network for repetitiously discharging the high energy storage network to apply high energy electrical pulses of greater than 1000 volts and 100 joules to the sparker electroe to generate the high energy acoustical pulses.

2. The acoustical probe apparatus as defined in claim 1 wherein the cascading voltage multiplying and high energy storage network includes a plurality of electrolytic capacitors for storing the electrical energy.

3. The acoustical probe apparatus as defined in claim 1 wherein the sparker section includes angularly spaced acoustical windows formed therein to enable the acoustical pulse to be transmitted into the surrounding earth at a corresponding angularly spaced locations.

4. The acoustical probe apparatus as defined in claim 2 wherein the plurality of electrolyte capacitors are cylindrical in shape and are physically positioned end-to-end along the length of the downhole high electrical energy section.

5. The acoustical probe apparatus as defined in claim 2 wherein the cascading voltage multiplying and high energy storage network includes at least four cascading stages.

6. The acoustical probe apparatus as defined in claim 1 further comprising a pulse detection network operatively connected to the electrode assembly for sensing the time occurrence of high energy electrical pulses and transmitting a low voltage detection signal to an uphole lapse time network.

7. The acoustical probe apparatus as defined in claim 6 wherein the pulse detection network includes a capacitor across a high value resistor for sensing the high energy electrical pulses and generating a low voltage detection signals time coincident therewith.

8. The acoustical probe apparatus as defined in claim 1 wherein the electrode assembly includes a central high voltage electrode and a plurality of angularly spaced ground electrodes radially spaced from the central high voltage electrode.

9. The acoustical probe apparatus as defined in claim 3 wherein the elongated probe has an elongated transducer section containing a plurality of angularly spaced acoustical transducers corresponding to the angularly spaced acoustical windows for receiving reflected acoustical energy.

10. The acoustical probe apparatus as defined in claim 1 wherein the pulse triggering network includes a downhole relay for applying the high voltage DC energy from the cascading voltage multiplying and high energy storage network to the electrode means.

* * * * *